US 6,598,491 B2

(12) United States Patent
Opie et al.

(10) Patent No.: US 6,598,491 B2
(45) Date of Patent: Jul. 29, 2003

(54) MAGNETOELASTIC TORQUE SENSOR

(76) Inventors: John E. Opie, 15 Buena Vista Rd., Stony Creek, CT (US) 06405; Brian Kilmartin, 1082 Avon Blvd., Cheshire, CT (US) 06410-0768

( * ) Notice: Subject to any disclaimer, the term of this patent is extended or adjusted under 35 U.S.C. 154(b) by 18 days.

(21) Appl. No.: 09/974,632

(22) Filed: Oct. 9, 2001

(65) Prior Publication Data

US 2002/0020230 A1 Feb. 21, 2002

Related U.S. Application Data

(63) Continuation of application No. 09/224,598, filed on Dec. 31, 1998, which is a continuation-in-part of application No. 08/829,125, filed on Mar. 28, 1997, now abandoned.

(51) Int. Cl.[7] ................................................ G01L 3/02
(52) U.S. Cl. ................................................ 73/862.333
(58) Field of Search ..................... 73/862.333, 862.334, 73/862.335, 862.332, 862.193; 324/244

(56) References Cited

U.S. PATENT DOCUMENTS

| 3,651,281 | A | * | 3/1972 | Becker ......................... 360/59 |
| 4,364,278 | A | | 12/1982 | Horter et al. |
| 4,680,544 | A | * | 7/1987 | Rudolf ......................... 324/259 |
| 4,697,145 | A | * | 9/1987 | Doriath et al. ............. 324/244.1 |
| 4,817,444 | A | | 4/1989 | Yagi et al. |
| 4,823,617 | A | | 4/1989 | Hase et al. |
| 5,520,059 | A | | 5/1996 | Garshelis ...................... 73/862 |
| 5,889,215 | A | | 3/1999 | Kilmartin |
| 6,330,833 | B1 | * | 12/2001 | Opie et al. .............. 73/862.333 |

FOREIGN PATENT DOCUMENTS

| EP | 0285260 | 2/1988 |
| EP | 0444575 | 9/1991 |

OTHER PUBLICATIONS

Patent Abstracts of Japan vol. 096, No. 012, Dec. 26, 1996, & JP 08 210931 A (Nippon Keiki Seisakusho:KK), Aug. 20, 1996.
Patent Abstracts of Japan vol. 013, No. 366 E–806) Aug. 15, 1989 & JP 01 123487 A (Yaskawa Electric Mfg Co Ltd), May 16, 1989.

* cited by examiner

Primary Examiner—Max Noori

(57) ABSTRACT

A magnetoelastic torque sensor for measuring the magnitude of torque applied to a member, comprising a magnetoelastic element which is disposed on and encircles the member, an outer flux guide extending across the magnetoelastic element in an axial direction and adjacent to the opposite end regions thereof, and an inner flux guide located between the first and second end regions, wherein the inner and outer flux guides provides a magnetic path to an axial component of the magnetic field produced by the magnetoelastic element in response to a non-zero value of torque. The inner flux guide is formed by cutting or etching an amorphous metal foil in a flat annular configuration with symmetrically projecting coil core tabs. The one-piece inner flux guide is supported by a support assembly comprising base and cover pieces. When assembled, the coil core tabs are sandwiched between two complementary semi-cylindrical mandrel portions projecting from the cover and base pieces, around which sense coil wires are wound. An electronic detector is coupled to the coil wires to measure the strength of the axial component of the magnetic field emanating from the magnetoelastic element as torque is applied to the member.

5 Claims, 9 Drawing Sheets

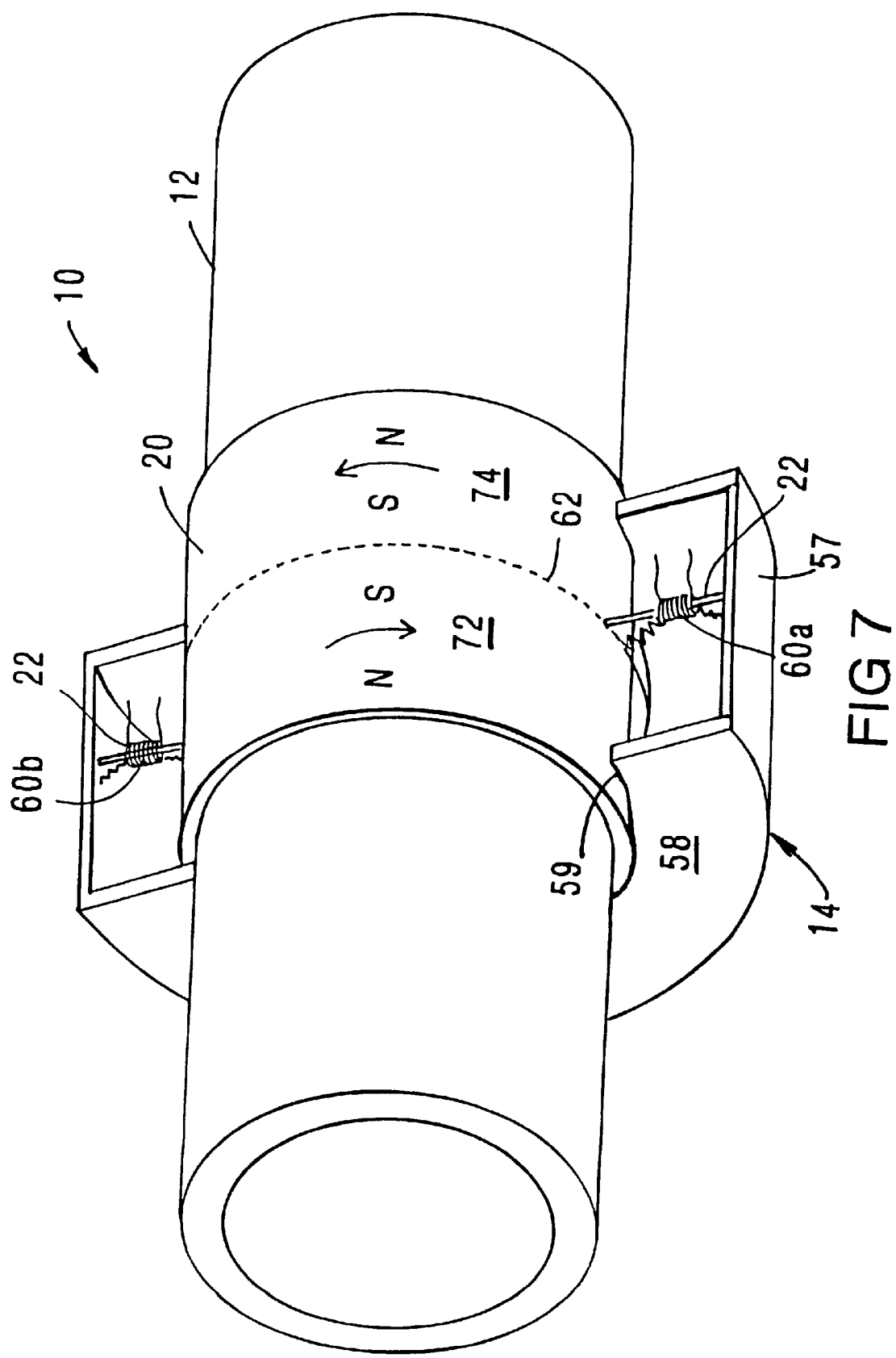

MAGNETOELASTIC TORQUE SENSOR

RELATED APPLICATION

The present application is a continuation of Ser. No. 09/224,598, filed Dec. 31, 1998 which is a continuation-in-part of U.S. patent application Ser. No. 08/829,125 filed on Mar. 28, 1997, now abandoned, the contents of which are hereby incorporated herein by reference in its entirety.

FIELD AND BACKGROUND OF THE INVENTION

This invention relates to a torque sensor, in general, and to a magnetoelastic torque sensor and a method for making such a torque sensor, in particular.

There are many applications where it may be desirable to sense the torsional stress applied to a torque-carrying member without contacting the member. In one type of apparatus for doing this, the torque-carrying member is surrounded by a magnetoelastic material, and a magnetic field detector is disposed adjacent to the magnetoelastic material for sensing changes in a magnetic field that passes through the material. These changes are indicative of torsional stresses within the torque-carrying member.

This type of magnetoelastic torque sensor is difficult to manufacture, costly, fragile and/or not well suited for rough-duty uses such as in the automotive and industrial fields.

SUMMARY OF THE INVENTION

It is an object of the invention to provide an improved magnetoelastic torque sensor for measuring the magnitude of torque applied to a torque-carrying member and a method for making such a torque sensor.

According to a feature of the invention, a magnetoelastic torque sensor is provided with an inner flux guide with a projecting sense coil core.

According to another feature of the invention, a magnetoelastic torque sensor is provided with an inner flux guide made of magnetically conducting foil in a flat annular configuration with a projecting sense coil core tab.

It is yet another feature of the invention to simply form the inner flux guide, by cutting, stamping or etching to reduce production costs and provide other benefits.

It is further feature of the invention to provide a magnetoelastic torque sensor which utilizes a common material for both the inner flux guide and the sense coil core.

According to features of the invention, a non-contact, non-compliant torque sensor which is mechanically robust, highly reliable and extremely accurate is provided. A magnetoelastic element is disposed around the torque-carrying member and is fabricated by a thermal spraying process, wherein the magnetoelastic material is bonded onto the underlying torque-carrying member such as e.g. a torsion shaft member. In operation, torque applied to the shaft member is sensed by measuring changes in the magnetic field of the magnetoelastic material. These magnetic field changes occur in response to the torque applied to the shaft member which deforms the magnetoelastic material thereon resulting in a change of the magnetic field. The invention provides a torque sensor with a simple configuration and, with electronics of the magnetic pickup device, provides the sensor with unprecedented performance even when compared to more costly torque sensing devices.

The magnetoelastic torque sensor of the invention comprises an inner ferromagnetic flux guide encircling the shaft member in the vicinity of the magnetoelastic element, an outer ferromagnetic flux guide magnetically coupled to an outer edge of the magnetoelastic element, and a sense coil core, or preferably a plurality of sense coil cores, connecting the inner and outer flux guides. The sense coil core in conjunction with the flux guides acts as a main part of a magnetometer for measuring the magnetic flux from the flux generating source, namely the magnetoelastic material. The magnetic flux is collected and ducted to the sense coil cores via the inner and outer flux guides. Ferromagnetic material that has a square magnetic hysteresis loop is used for the cores of the sense coils. Amorphous metal materials (also commonly referred to as "Metglas" or "glass transition metal") are preferably used at least for the construction of the sense coil cores.

According to another feature of the invention, in one embodiment an inner flux guide comprises a cylindrical ring structure (FIG. 5) fabricated from high permeability, low coercivity material generally referred to as Mu Metal. The ring structure has a pair of holes formed therein 180 degrees apart for receiving therein an amorphous wire which serves as the sense coil core. For the termination of the coil core to the outer flux guide which forms the flux return path, small notches are provided in the outer flux guide into which the amorphous wires extend.

According to a further feature of the invention, in a preferred embodiment a one-piece integral, inner flux guide and sense coil core is formed with at least one and preferably a single layer of amorphous metal foil having an annular configuration and at least one coil core tab in the same plane as that of the annular configuration.

The one-piece inner flux guide is supported, according to features of the invention, by cover and base pieces which are mounted about the shaft member so that the inner annular edge of the inner flux guide is slightly spaced apart from the magnetoelastic element. These cover and base pieces provide support for the metal foil, a substrate for printed electronic circuitry, mandrels of bobbins for centering the foil coil core tabs and for winding of the sense coils, and termination sites for coil wire connection to the electronic circuit while reducing the number of components to three. When assembled, the coil core tab is sandwiched between two complementary semi-cylindrical mandrel portions extending from the cover and base pieces. Coil wires are wound around the mandrel portions, which sense a change in the magnetic field of the magnetoelastic element as torque is applied to the shaft member.

Due to the one-piece amorphous metal foil serving as a combination flux guide and coil core material, a packaging is enabled with the single planar form of the foil. The flux guide foil formation is placed on a molded plastic carrier as the base piece, with its protruding tabs extending through the centers of the integral bobbins. A molded printed circuit board as the cover piece is positioned over the flux guide foil, with alignment features guaranteeing center hole concentricity and forming a sandwich to support and contain the amorphous foil formation. Molded protrusions from the circuit board complete the round winding mandrels of the bobbins, positioning the amorphous foil tabs in the center to serve as coil cores. The printed circuit board is extended in one region to allow the mounting and circuitry for interface electronic components and the electrical connector. This stack-together assembly greatly simplifies the manufacturing process and provides all of the essential features, the inner flux guide and its support (base and cover pieces), with essentially three elements.

According to a feature of the preferred embodiment of the invention, an approximately 0.001" thick amorphous metal foil is laser cut or etched to form a flat ring with symmetrical, protruding coil core tabs spaced 180 degrees apart as the one-piece inner flux guide and sense coil core. This form of foil constitutes the inner flux guide for ducting flux from the source to be measured (e.g. the shaft and its magnetoelastic element which it encircles). It has been found that with very small cross sectional areas, even materials with relatively high magnetic saturation density characteristics will saturate at a modestly low point; also the saturation point will vary directly with cross sectional area. Given a constant material thickness (in this case about 0.001"), the saturation point will vary as a function of material width. An approximately 0.007" diameter amorphous wire used as the sense coil core in the first embodiment is replaced by a strip of about 0.001" thickness amorphous foil in the preferred embodiment. It has been found that a foil strip with a width of 0.040" has a cross sectional area approximately equal to that of a 0.007 diameter wire, and produced similar performance to the wire core of the first embodiment when used as a coil core. The width of the foil tabs may range from about 0.030" to 0.60", and is optimum at 0.040" (1 mm). The same parameters can be used with an amorphous material deposited on a suitable substrate by means of plating, thermal spraying, vapor deposition, and the like.

The one-piece amorphous foil formation of the inner flux guide of the present invention effectively improves the fabricated Mu Metal flux guide ring and the amorphous "Metglas" wire used in the first embodiment. While reducing the number of parts and the total cost, the preferred embodiment of the present invention allows greater freedom in packaging design and greatly simplifies the assembly techniques. The one-piece inner flux guide of the preferred embodiment is simple in construction and minimizes the manufacturing costs of producing a magnetometer of a torque sensor. In addition, the use of the amorphous foil as a coil core material simplifies the termination of the coil cores to the outer flux guide, and the need for forming wire notches in the outer flux guide of the first embodiment is eliminated. The foil tabs of the one-piece inner flux guide are thin and flexible enough to bend 90 degrees and so contact side walls of a pair of drawn cup-shaped pieces of the outer flux guide.

To serve as a flux guide and effectively conduct flux from the magnetoelastic material on the shaft to the sense coil cores, the preferred foil formation possesses a greater flux capacity in its annular section to ensure that the annular section does not saturate before the coil cores. Because a common material is used for both the inner flux guide and the coil cores, it was found important to use a strip of greater width in the annular section of the inner flux guide. It was found that a width of about 0.100" was adequate for performance goals.

The one-piece inner flux guide is capable of gathering magnetic flux generated from the magnetoelastic material encircling the shaft and conducting the collected magnetic flux to its one-piece coil core tabs. Although multiple layers of amorphous foil can be utilized, to keep fabrication to its simplest form, a single layer of foil is preferably employed since it performs as well as multiple layers.

The first and preferred embodiments of the present torque sensor function in the same fashion. Both embodiments differing essentially in the configuration of their inner flux guides.

The flux guide assembly of the invention is further provided with outer flux guides constructed of Mu Metal to form the flux return path. The flux guide assembly acts to provide a flux density gain by concentrating the magnetic signal into the area of the pickup devices, to integrate irregularities out of the signal being measured by collecting the magnetic flux over a larger angular distance, to shield the magnetic signal from the influence of stray magnetic fields, and to shield the pickup devices from electromagnetic interference. The geometric placement of the magnetic pickup devices (coils located between the flux concentrators on opposite sides of the magnetoelastic element) creates a common mode rejection configuration which cancels the effects of stray fields which pass through both pickup devices in the same direction.

The electronic, circular magnetometer of the invention measures the strength of the magnetic field emanating outward (or inward) from the shaft, at the circumferential centerline of the magnetoelastic element. The torque sensor of the present invention has various uses including, but not limited to, automotive technologies. The automotive applications include steering wheel applications in electric power steering systems, as well as crankshaft torque measurements, anti-lock brake system wheel torque measurements, vehicle suspension measurements, and brake pedal torque measurements for electric braking.

According to a further feature of the invention, the magnetoelastic element made of a high nickel content powered metal is thermally sprayed onto the shaft member. This thermal spray process fuses the coating to the shaft member. The thermal spray coating provides a typical bond strength in the order of 10,000 psi or greater. In this manner, the present invention improves the ability of the magnetoelastic element to form an intimate bond with the shaft member capable of surviving high torque levels. The integrity of this interface is crucial to the stability of the magnetoelastic properties. In addition, the thermal spray process achieves a high level of uniformity in the sprayed material density, chemical composition, internal stresses, and the surface finish and translates into exceptional rotational regularity of the magnetic signal. The homogeneity of the thermally sprayed metal properties directly relates to consistency in the magnetic performance of the magnetoelastic element. The composition of the sprayed material in conjunction with spray parameters (particle size, particle velocity, powder feed rate, etc.) may be selected so as to foster maximum hardness, low levels of oxides, and low porosity, and to yield a magnetoelastic element with optimum resistance to the effects of corrosives and to stress cracking.

BRIEF DESCRIPTION OF THE DRAWINGS

With the above and other objects and other advantages in view, the present invention will become more clearly understood in connection with the detailed description of embodiments, when considered with the accompanying drawings, of which:

FIG. 7 is a diagrammatic perspective view of the torque sensor of FIGS. 1–4 of the present invention, illustrating the outer flux guides extending across the magnetoelastic element in an axial direction and showing the tabs of the one-piece inner flux guide with its other portions not being shown for simplicity of illustration.

DETAILED DESCRIPTION OF THE PREFERRED EMBODIMENT

Figure 8:
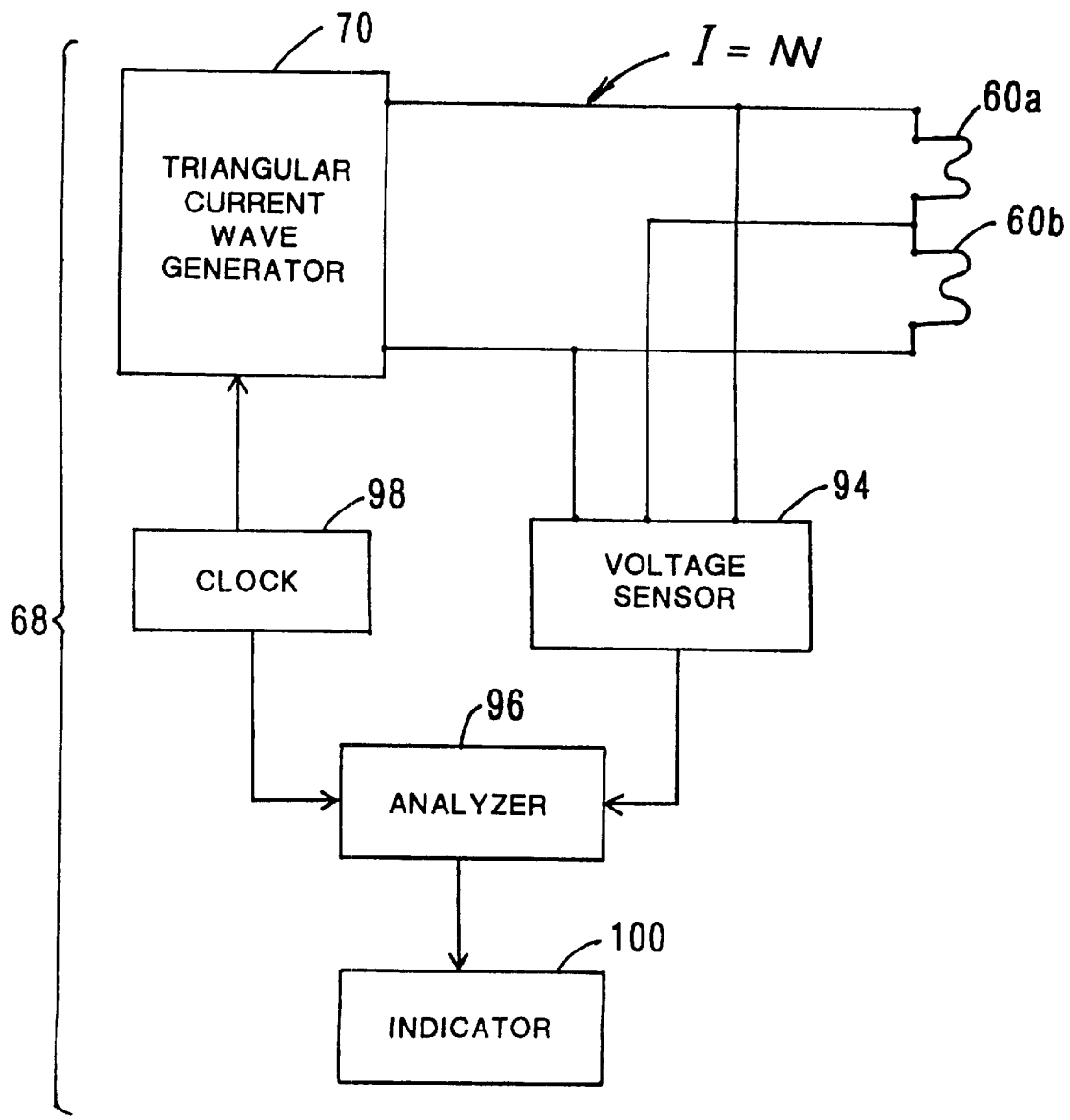
FIG. 8 is a block diagram an electronic detector of the resent invention.

FIGS. 1–3 and 7 show a torque sensor 10 according to the preferred embodiment of the invention for measuring the amount of torque applied to a torque-carrying member. A shaft 12 as the torque-carrying member is preferably made of non-magnetic material. The torque sensor 10 comprises a magnetoelastic element 20, an inner flux guide 16 (or 16a FIG. 5), an outer flux guide 14, and an electronic detector 68 (FIG. 8).

Figure 4:
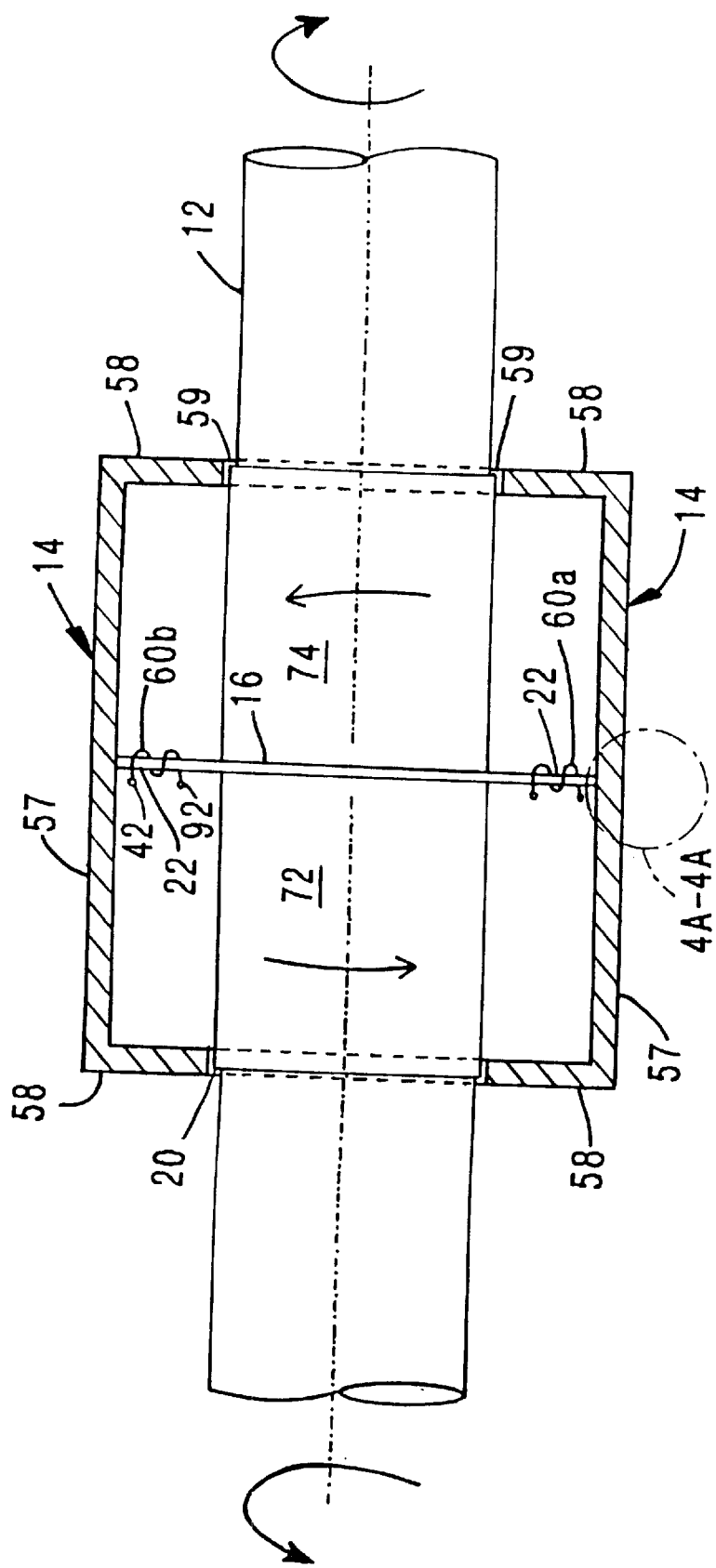
FIG. 4 is a front view, partly in cross section, of the torque sensor of FIGS. 1–3, with the support assembly for the inner flux guide not being shown for simplicity of illustration, and wherein the thickness of the inner flux guide is not shown proportionally.

Referring to FIGS. 4 and 7, the magnetoelastic element 20 is disposed, at a particular location, on the shaft 12 encircling the shaft 12. The magnetoelastic element provides a pair of oppositely polarized magnetic domains 72, 74, defining a circumferential centerline 62 therebetween. The magnetoelastic element 20 has a circumferentially directed magnetic field as indicated by the arrows and has no magnetic polarity in an axial direction in the absence of torque being applied to the shaft. If torque is applied, the resulting stress on the magnetic element causes the direction of the magnetic field to change, providing an axial component. The inner flux guide (16 or 16a) and the outer flux guide 14 provides a magnetic path to the axial component of the magnetic field produced by the magnetoelastic element 20 in response to a non-zero value of torque. FIG. 7 illustrates coil cores 22 about which coil wires 60a, 60b are wound. The remainder of the inner flux guide (16 or 16a) is not shown for the ease of illustration. The detector 68 is operatively coupled to the coil wires for determining the torque applied to the shaft 12 by measuring the axial component of the magnetic field, wherein the magnitude of the axial component represents the amount of torque applied to the shaft.

The attaching of the magnetoelastic element 20 to the shaft 12 may be carried out in a number of ways. One such method is by intimately bonding a magnetoelastic material to the shaft as described in U.S. patent application Ser. No. 08/829,125, the entire contents thereof being hereby incorporated by reference herein, which describes a thermal spraying process which fuses a coating of a high nickel content powered metal to the underlying shaft creating a gradation at the substrate/coating interface boundary. The thermal spray process provides an intimate bond between the magnetoelastic element 20 and the underlying shaft 12 capable of surviving high torque levels. In this manner, the magnetoelastic element 20 essentially becomes part of the shaft 12 and will deform as torque is applied to the shaft, which changes the axial component of the magnetic field dependent on the applied toque.

Figure 1:
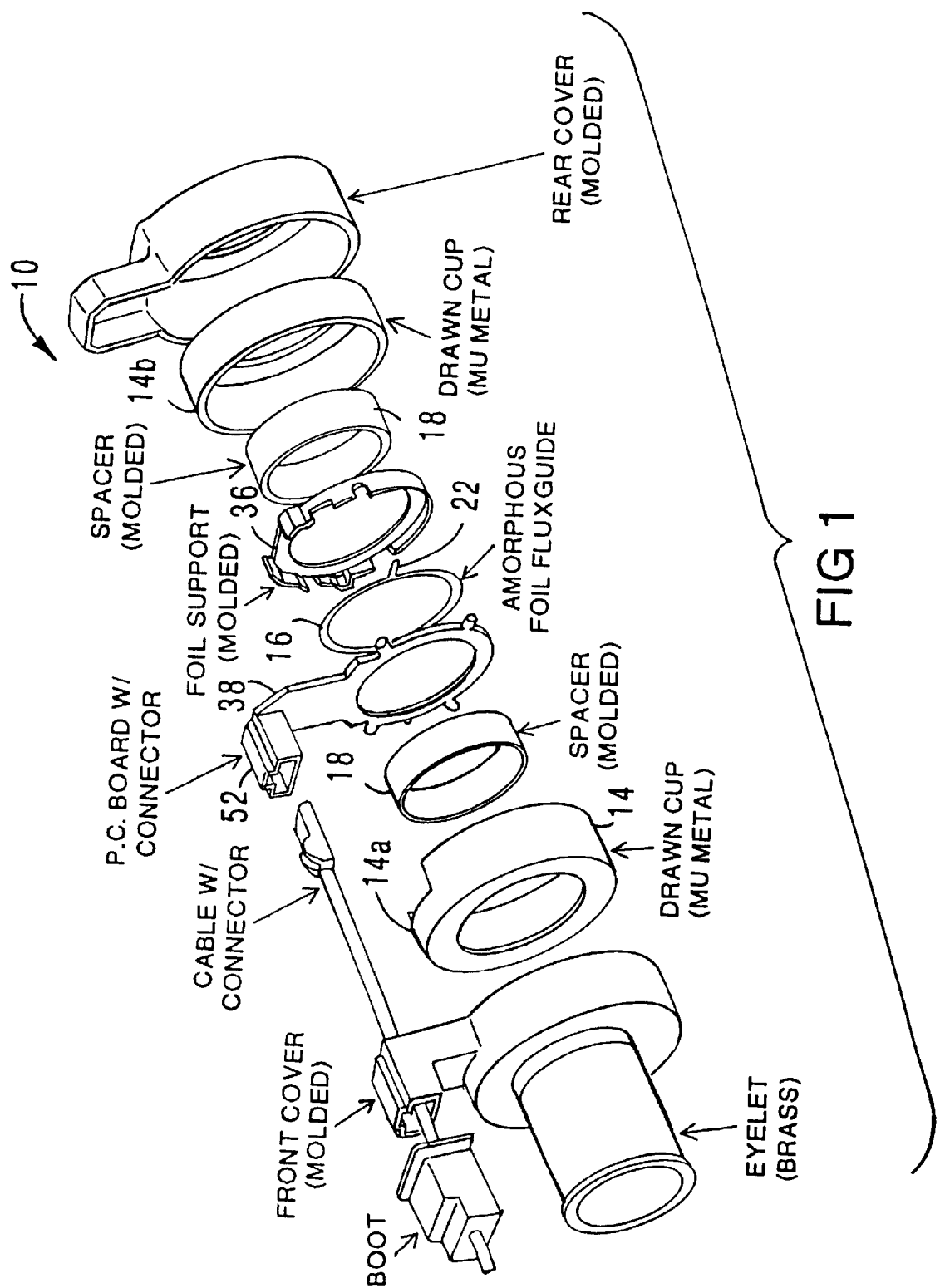
FIG. 1 is an exploded view of a preferred embodiment (also referred to herein as the second embodiment) of a torque sensor of the present invention.

Referring to FIG. 1, the outer flux return guide 14 comprises a pair of drawn cup-shaped pieces 14a, 14b which extend concentrically to the shaft 12 and spaced from and across the magnetoelastic element 20 in an axial direction. The outer flux return guide 14 is preferably made of Mu metal material, for example HyMu 80, which is ferrous (i.e. magnetic) material. The outer flux guide 14 includes annular walls 58 having inner annular edges 59 forming central openings, with the annular edges 59 slightly spaced apart from the magnetoelastic element 20, as depicted in FIGS. 4 and 7. The cylindrical wall 57 and the annular walls 58 form the flux return path.

Figure 5:
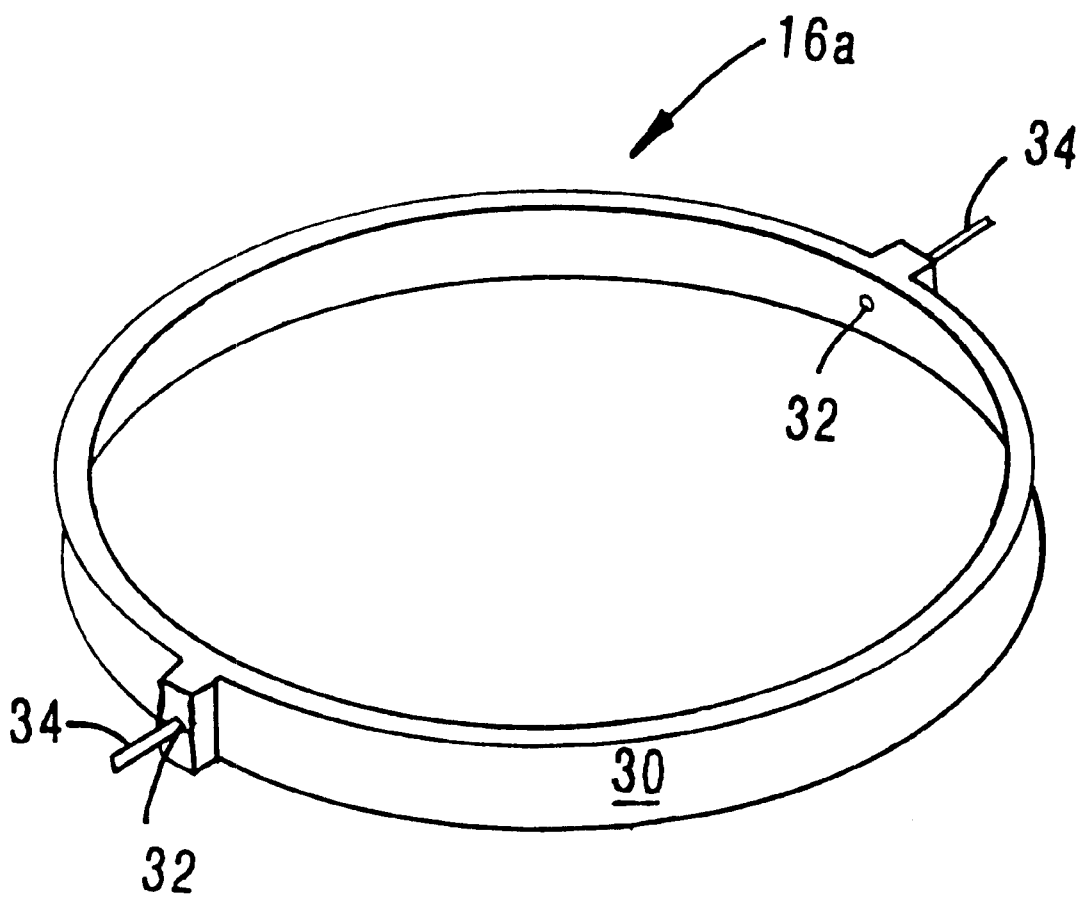
FIG. 5 is a diagrammatic perspective view of an inner flux guide of a first embodiment, illustrating amorphous wires inserted through tiny holes formed therein.

FIG. 5 illustrates an inner flux guide 16a employed in the first embodiment of the invention. The inner flux guide 16a includes a cylindrical ring structure 30 fabricated from high permeability, low coercivity material generally referred to as Mu Metal. The components fabricated from Mu Metal, such as the ring structure and the outer flux guide 14 (not shown in FIG. 5), are readily machineable and must be annealed to restore their desirable magnetic properties. The ring structure 30 has a pair of wire holes 32 formed therein 180 degrees apart for receiving a pair of coil cores 34. Amorphous metal material is used for the cores 34 of the sense coils. At least one amorphous wire 34, having a diameter of preferably about 0.007 inch, is inserted through each of the wire holes 32 formed in the ring structure 30. For the termination of the coil cores to the outer flux guide 14 which forms the flux return path, small notches (not shown) are provided in the outer flux guide which allow the amorphous wires to extend therein.

The first embodiment incorporates an array (not shown) of separate parts such as a printed circuit board, formed wired terminals, structural plastic forms, and the formed inner and outer metal flux guides 16a (FIG. 5) and 14 (FIG. 7) fitted together as an assembly (not shown). This assembly establishes and maintains the geometric relationships between the components, and to provide for winding of sense coils 60a, 60b on the coil cores 34, provide termination for the coil wires 60a, 60b, provide mounting for a printed circuit board, etc.

Figure 2:
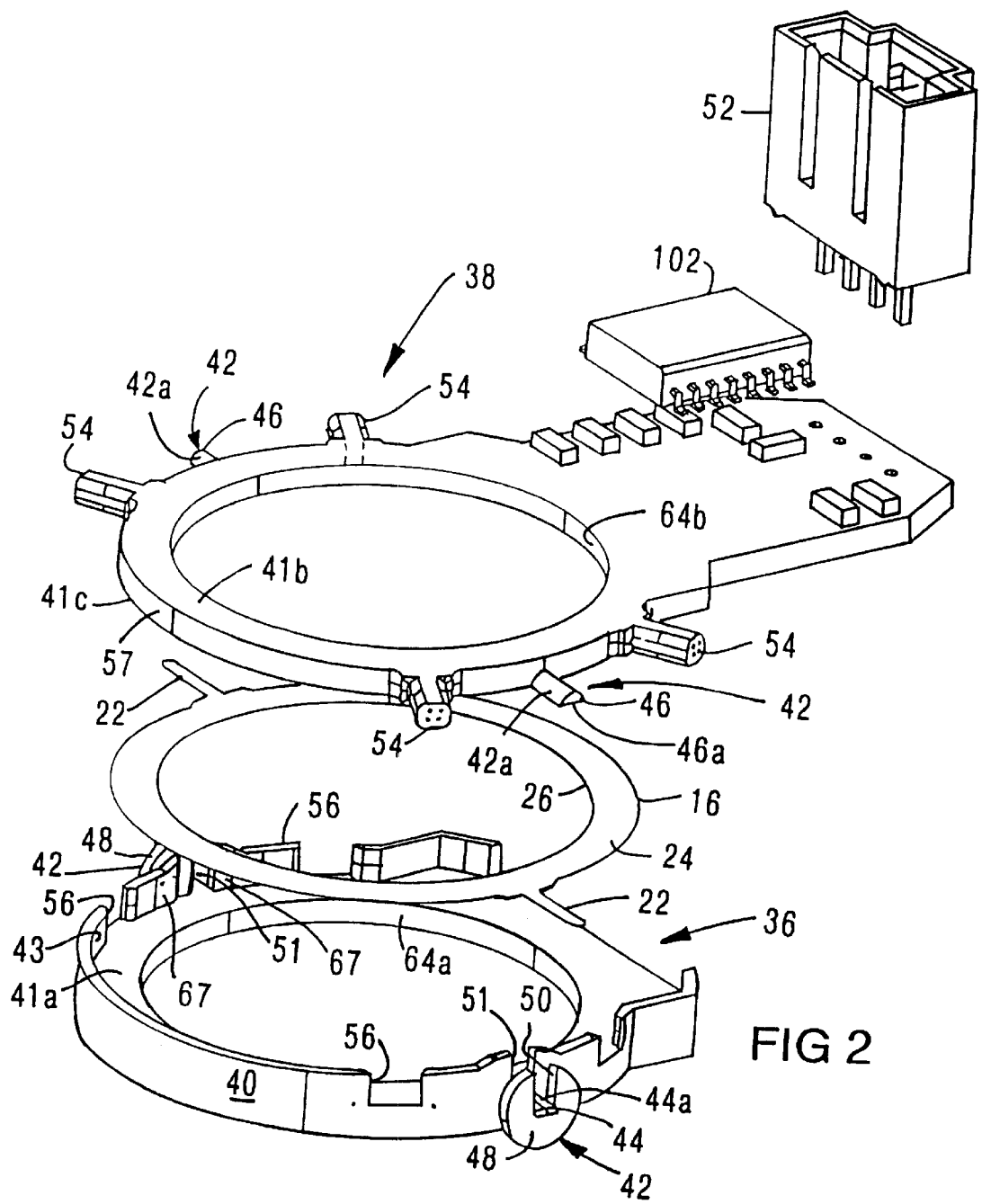
FIG. 2 is an exploded view of the inner flux guide assembly of the present invention of FIG. 1 with cover and base pieces.
Figure 3:
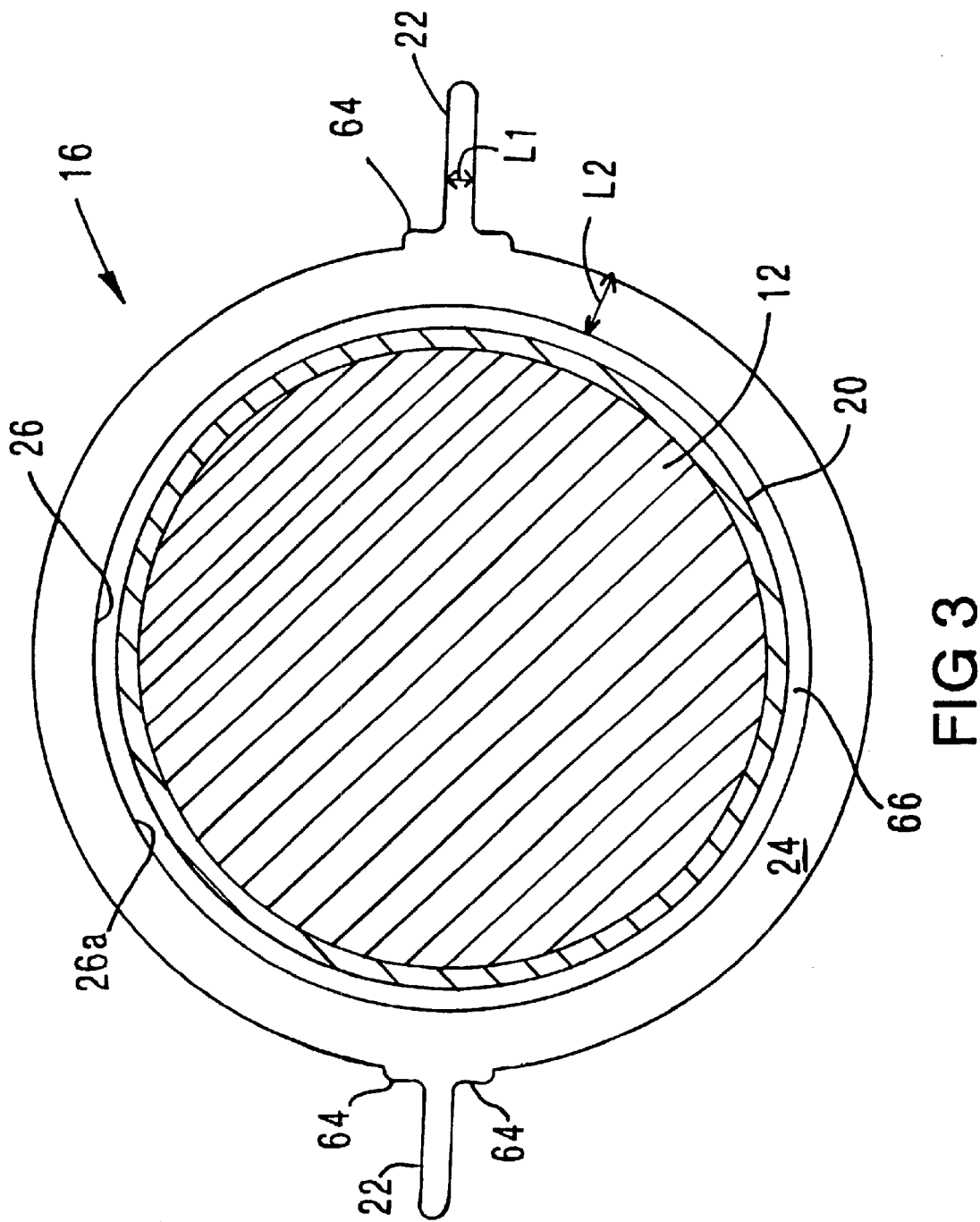
FIG. 3 is a side elevational view of the inner flux guide of FIGS. 1–2 positioned about a shaft shown in cross-section, illustrating integral coil core tabs protruding from an outer peripheral edge of the inner flux guide.

Referring to FIGS. 2 and 3, the preferred embodiment of the inner flux guide 16 includes an annular section 42 and integral in one-piece therewith a pair of coil core tabs 22 projecting outwardly in the plane of the annular section 24. The inner flux guide 16 is situated about the circumferential centerline 62 and serves to duct the axial component of the magnetic flux from the flux generating source (namely the magnetoelastic element 20 encircling the cylindrical shaft 12) to the coil core tabs 22 when torque is applied to the shaft. The inner flux guide 16 collects the magnetic flux from the circumferential centerline 62 of the magnetoelastic element 20 and conducts the flux via the coil core tabs 22 to the outer flux guides 14 which provide the flux return path to the axial ends of the magnetoelastic material 20 on the shaft 12. In this way, the inner and outer flux guides 16 and 14 provide a flux density gain by concentrating the magnetic signal into the coil core tabs 22, around which are wound coil wires 60a, 60b.

The inner flux guide 16 of the preferred embodiment of FIGS. 1–4 and 7 is preferably made of an amorphous metal foil. The amorphous metal material, which is also commonly referred to as "Metglas" or "glass transition metal", is a magnetically soft material having low coercive force and high permeability. The inner flux guide 16 is formed, by stamping in a stamping die, laser cutting or etching from one or more sheets of amorphous metal foil, in a flat annular configuration with symmetrically projecting, coil core tabs 22 which are arranged 180 degrees apart. One important aspect of the present invention is that the inner flux guide 16 and the coil cores 22 are made in one-piece from an amorphous foil, thereby eliminating the need for other parts such as separate amorphous wires 34 as the coil cores and holes 32 as in the first embodiment of FIG. 5.

The preferred embodiment of the inner flux guide 16 (FIGS. 1–4, 7) is simple in construction and adapted for easy assembly. This one-piece formation of the inner flux guide 16 has lower manufacturing costs compared with that of the first embodiment (FIG. 5). On the one hand, the production costs associated with the need to anneal the ring structure 30 to restore its desirable magnetic properties are eliminated. On the other hand, the production costs associated with the inserting and affixing of the amorphous wires 34 in the wires holes 32 of the ring structure 30 are also eliminated in the preferred one-piece inner flux guide embodiment. Moreover, the use of the amorphous foil as a coil core material simplifies the termination of the coil cores to the outer flux guide and the need for forming wire notches in the outer flux guide is eliminated.

The inner flux guide 16 has a central opening 26 formed therein through which the shaft 12 with its layer of magnetoelastic material 20 extends. The central opening 26 of the inner flux guide 16 has a diameter slightly greater than that of the shaft 12 with the magnetoelastic material 20 such that a clearance space or a gap 66 is created between the shaft 12 with the magnetoelastic material 20 and an inner periphery 26a of the inner flux guide 16 which forms the opening 26.

The annular section 24 of the inner flux guide 16 preferably has a width L2 which is preferably greater than the width L1 of the coil core tabs so as to effectively duct the axial component of the magnetic flux from the generating source to the coil core tabs 22. In the preferred embodiment, each of the coil core tabs 22 has a width L1 of, for example, preferably about 0.040 inch and the annular section has a width L2 of preferably about 0.100 inch. The inner flux guide 16 has a thickness of, for example, preferably about 0.001 inch. While a 0.001 inch thick amorphous foil is used in the preferred embodiment, it should be noted that the same parameters can be used with an amorphous material deposited on a suitable substrate by means of plating, thermal spraying, vapor deposition, and the like.

Referring to FIGS. 1 and 2, the torque sensor 10 of the present invention also includes a support assembly (36, 38) providing stable structural support for the inner flux guide 16. The support assembly comprises a base piece 36 and a cover piece 38 which together immovably hold the inner flux guide 16 in place. The base and cover pieces 36, 38 preferably are made of plastic material. Each has an annular face 41a, 41b, 41c, and inner peripheries 64a, 64b defining central openings for the cylindrical shaft 12 (not shown in FIGS. 1 and 2) to pass therethrough. The inner peripheries 64a, 64b of the base and cover pieces 36, 38 have a diameter slightly greater than that of the shaft 12 with the magnetoelastic material 20 so that the inner cylindrical peripheries 64a, 64b can be maintained in a spaced apart relationship with respect to the shaft 12 with the magnetoelastic material 20. When mounted about the shaft 12, the base 36 and cover 38 pieces together with the inner flux guide 16 are situated about the shaft so that the inner peripheries 64a, 64b, and 26a are spaced apart from the magnetoelastic element 20 of the shaft 12 to prevent scratching of the material of the magnetoelastic element.

The cover piece 38 has an outer peripheral cylindrical wall 57 and a plurality of angularly arranged termination segments 54 extending radially outwardly therefrom. The termination segments 54 contain circuit traces leading to electronic components of the sensor and are the termination points for the coil wires 60a, 60b (FIG. 4). The nature of the sensing electronic circuitry for detecting changes in the magnetic field allows it to be constructed as a single integrated circuit (IC) chip or an application specific integrated circuit (ASIC). This chip 102 is a plastic, surface mount, 16-pin SOIC packaged component. The cover piece 38 includes electronic circuitry for interfacing to electronic components and an electrical connector 52. The base piece 36 has an integral outer peripheral cylindrical wall 40 having an inner cylindrical wall 43 which is complementary to the outer cylindrical wall 57 of the cover piece 38 in the assembled position. A plurality of axial channels 56 formed in the cylindrical wall 40 of the base piece 36 extends from the top edge of the wall 40 to the annular face 41a. The axial channels 56 are arranged so as to axially align with the termination segments 54 protruding from the cover piece 38. In the assembled position, the termination segments 54 are disposed in the axial channels 56.

The support assembly pieces 36, 38 include a pair of bobbins 42 integrally molded thereto for receiving the coil winding wires 60a, 60b. Each of the bobbins 42 includes a cylindrical shaped mandrel 42a which comprises a first semi-cylindrical portion 44 and a second semi-cylindrical portion 46 integrally extending radially outwardly from the cylindrical wall 40 of the base piece 36 and the cylindrical wall 57 of the cover piece 38, respectively. The first and second semi-cylindrical portions 44 and 46 are mirror images of each other and have facing flat surfaces 44a and 46a, respectively, configured to sandwich therebetween the core tabs 22 of the inner flux guide 16. The first portions 44 are complementary to the second portions 46 and are axially aligned with each other, so that when the cover piece 38 is assembled on the base piece 36, the inner flux guide 16 is sandwiched on and between the annular faces 41a, 41c, the semi-cylindrical portions 44, 46 forming in combination the cylindrical shaped mandrel 42a for winding of coil wires 60a, 60b of the detector 68 (FIG. 8).

Figure 4A:
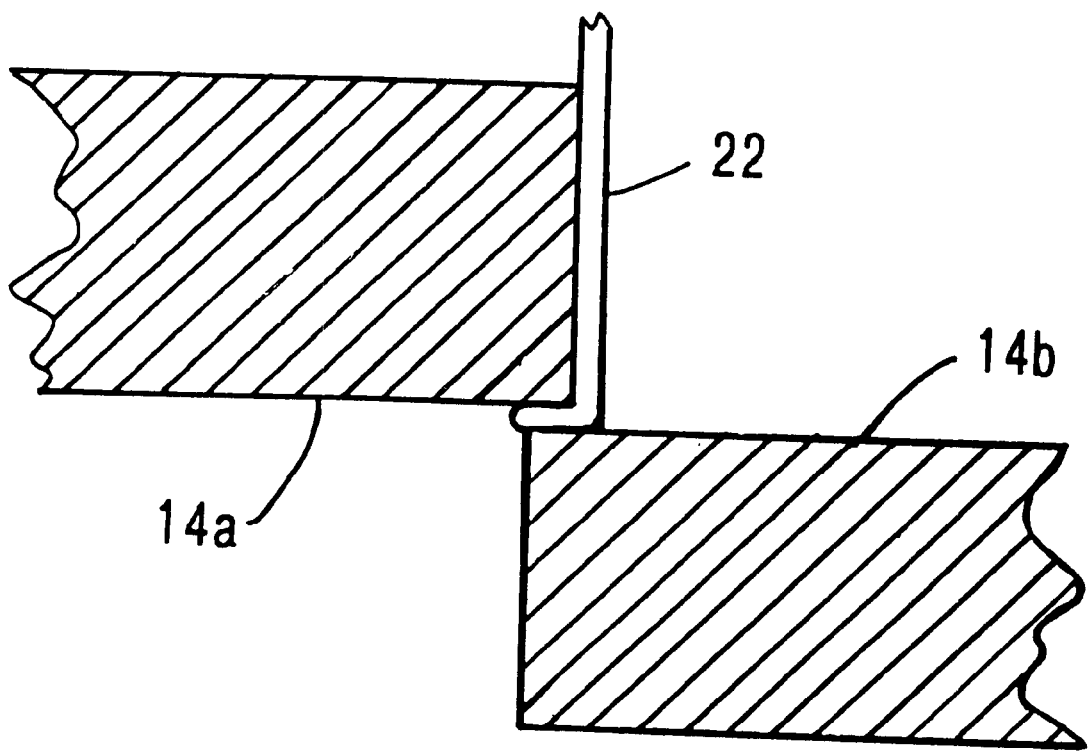
FIG. 4A is an enlarged view of the area 4A—4A of FIG. 4.

The coil core tabs 22 have a length which is preferably greater than the length of the mandrels 42a such that the ends of the tabs 22 protrude a short distance beyond slotted circular end flanges 48 of the bobbins 42. The end flanges 48 are formed on the radially outer ends of the semi-cylindrical portions 44 of the bobbins. In the assembled position, the ends of the tabs 22 are in contact with or welded to the outer return flux guide 14. Referring to FIG. 4A, one of the drawn cup-shaped pieces e.g. 14a of the outer flux guide fits into the other drawn cup-shaped piece 14b such that the two outer flux guide pieces 14a, 14b overlap, for example about 0.060 inch. The ends of the tabs 22 are bent 90 degrees from the common plane of the inner flux guide 16 and held between the outer flux guide pieces 14a, 14b in the overlapping region, as shown in FIG. 4A. The circular flange 48 (not shown in FIG. 4A) of the bobbin 42 presses against the outer flux guide pieces 14a providing support and stability for the coil core tabs 22.

The first semi-cylindrical portions 44 terminate in the slotted circular flanges 48 at an end remote from the cylindrical wall 40 for receiving the coil wires 60a, 60b therebetween. The circular flange 48 has an axial slot 50 extending from its upper edge to about its center. The cylindrical wall 40 also has slots 51 formed therein which are in radial alignment with the slots 50 to permit the radially projecting second semi-cylindrical portions 46 to slide into the slots 50, 51 and lay flat with their flat surfaces 46a against the tabs 22 of the inner flux guide 16 which also lies flat against the flat surfaces 44a of the first semi-cylindrical portions 44 upon assembly. Then the coil wires 60a, 60b are wound on the mandrels 42a.

To assemble the sensor, the inner flux guide 16 is placed on the annular face 41a of the base piece 36 with the coil core tabs 22 extending through the slots 51 formed in the cylindrical wall 40 of the base piece 36 and the slots 50 formed in the circular end flanges 48 of the integral bobbins 42. As seen in FIG. 3, a shoulder 64 is provided on both sides of the coil core tabs 22 for registry with complementary axial recesses 67 in the inner wall 43 of the base piece 36. The shoulders 64 aid in centering and stabilizing the inner flux guide 16 and the tabs 22 in proper position on the base support piece 36. After placing the inner flux guide 16 and the tabs 22 in registry with the base piece 36 on the annular face 41a and the mandrel portions 44 extending through the slots 50, 51, respectively, the cover piece 38 is positioned inside the inner wall 43 of the base piece 36 with alignment of the termination segments 54 in the channels 56 as well as the semi-cylindrical potions 46 in the slots 50, 51. The cover piece is so placed on the inner flux guide 16, sandwiching and supporting the amorphous foil flux guide 16 between the base 36 and cover 38 pieces. The exterior configuration of the cylindrical wall 57 substantially coincides with the interior configuration of the cylindrical wall 40 so that the cover piece 38 snuggly fits into the base piece 36. In addition to the frictional fit, the coil wires 60a, 60b wound around the cylindrical mandrels 42a also serve to hold the base and cover pieces 36, 38 together. A pair of spacers 18 (shown in FIG. 1) is provided to maintain the PC board (cover piece 38) centered between the pair of drawn cup-shaped pieces 14a, 14b.

The terminations segments 54 and the second semi-cylindrical portions 46 in combination with the axial channels 56 and slots 50, 51, respectively, serve as alignment features to ensure concentricity and proper alignment. After the cover and base pieces have been registered and telescoped together, the coil wires 60a, 60b are wrapped on the bobbins 42 around their mandrels 42a and the ends of the wires 60a, 60b are connected to the circuit traces contained in the termination segments 54 for connecting the coil wires 60a, 60b to the detector 68. The detector 68 coupled to the coil wires 60a, 60b forming the coil 60 measure changes in the magnetic field of the magnetoelastic element 20 indicated by change in flux through the core tabs 22.

Figure 6A:
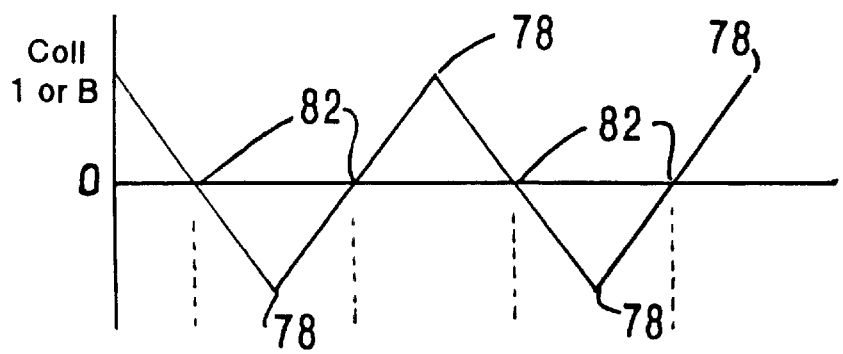
FIGS. 6A, 6B, and 6C are three graphs illustrating the permeability of the coil core and the voltage across the coil terminals in response to the triangular drive current being driven into the coil wires.
Figure 6B:
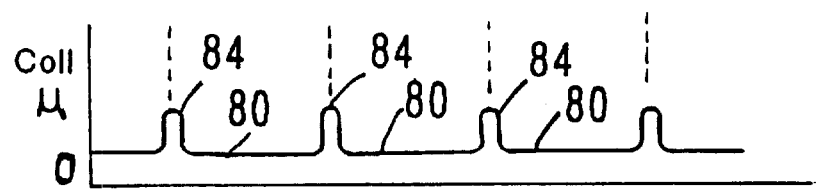

Referring to FIGS. 4, 6A–6C, 8, the detector 68 measures the strength of the axial component of the magnetic field emanating from the magnetoelastic element 20 by monitoring current changes in the coil 60. The detector 68 includes a triangular wave generator 70 which is coupled to the coil 60 for driving a triangular current into the coil wires 60a, 60b, as shown in FIG. 6A. The coil 60 includes series connection of the two coil wire sections 60a, 60b. The triangular current drives the coil core tabs 22 in and out of magnetic saturation. For large values of coil current, as indicated at 78, the material of the coil core tabs 22 saturates and consequently has a relatively small permeability value, as indicated at 80 in FIG. 6B. For small values of coil current, as indicated at 82, the material of the coil core tabs 22 is unsaturated and its permeability increases, as shown at 84 in FIG. 6B. As a result, a plot of permeability versus applied current (as well as versus magnetic field) shows the peak value of permeability, each peak value occurring with near zero values of current.

Figure 6C:
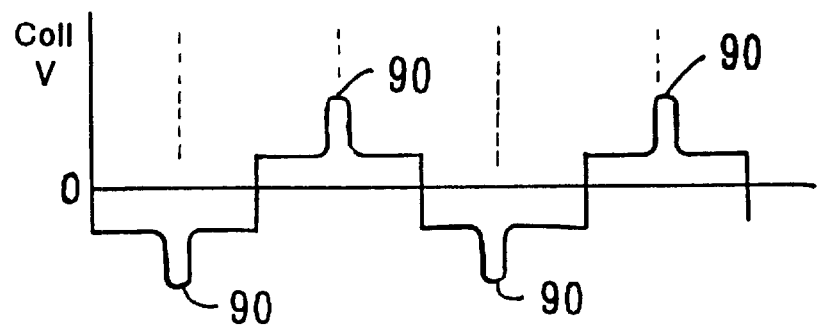

The voltage value across the coil terminals 92, which is measured via a voltage sensor 94, is proportional to the permeability of the coil core tabs, as depicted in FIG. 6C. The voltage peaks 90 coincide with the near zero values of the coil current.

When torque is applied to the shaft 12, the permeability of the material of the coil core tabs 22 changes as a result of the positive or negative magnetic field emanating from the magnetoelastic element 20. This additional magnetic field from the magnetoelastic element causes the periodic peaking of the permeability of the coil core 22 to shift with respect to a point in time wherein the triangular current passes through zero. The detector 68 also includes an analyzer 96 which translates the time shift of the periodic peaking of the permeability into a corresponding value of torque, and an indicator which is coupled to the analyzer and outputs a signal representing the magnitude of torque applied to the shaft 12.

The operation of the torque sensor 10 will now be described. The torque is sensed by measuring changes in the magnetic field of the magnetoelastic material 20 affixed to the shaft 12, caused by a torque applied to the shaft 12. When no torque is applied to the shaft 12, the magnetoelastic element 20 has no magnetic polarity in the axial direction and remains in a state of equilibrium. If torque is applied, the resulting stress on the magnetoelastic element 20 causes the direction of the magnetic field to change providing an axial component of the magnetic field responsive to the degree of torque applied to the shaft 12. The inner flux guide 16 or 16a and the outer flux guide 14 provides a magnetic path to the axial component of the magnetic field produced by the magnetoelastic element 20 in response to a non-zero value of torque. The detector 68 coupled to the coil wires 60a, 60b determines the torque applied to the shaft 12 by measuring the axial component of the magnetic field, the magnitude of which represents the amount of torque applied to the shaft. In this manner, the torque sensor 10 of the present invention measures the strength of the magnetic field emanating outward or inward from the shaft 12, at the circumferential centerline 62 of the magnetoelastic element 20 and provides a signal output representing the magnitude of torque applied on the shaft.

Fundamental to the torque sensor of the invention is the creation of magnetic anistropy in the cylindrical magnetoelastic sense element 20 which creates circumferentially directed magnetic flux.

Anisotropic forces compel magnetic domains to orient in a common direction, thereby creating a well-defined magnetic field. These forces can originate from many sources including mechanical stresses in the magnetoelastic element, its shape and the atomic structure of the material (e.g., crystal anisotropy). In order to establish a stable, quiescent magnetic condition, the domains must be "pinned" to positions that are favorable to the application. The pinned positions of domains are referred to as their easy axes.

One method for correctly aligning domains is to orient them prior to pinning. This can be achieved through the crystallization of the material in an aligning magnetic field while the material is cooled down from some temperature above the Curie point. An alternate method is to orient the domains during the deposition process itself by thermal spraying material at low velocity and low temperature while the shaft 12 is exposed on an aligning magnetic field (not shown).

Another anisotropic force used to align and pin magnetic domains in the thermal sprayed magnetoelastic element is circumferentially directed stress. Not only does this circumferentially directed stress align and pin domains (essentially creating the substructure for a magnet), it also provides the thermal sprayed material with a biased stress pre-load that makes practical an employable magnetoelastic effect.

The thermal sprayed material that comprises the magnetoelastic element of the torque sensor of the invention has a negative magnetoelastic constant. This fact mandates that the material be pre-loaded with compressive stress in order to function as a transducer. The torque sensor device obtains compressive stress in the magnetoelastic element 20 by means of a high velocity, thermal spray process. The following procedures prevent the process from yielding isotropic compressive stress, as opposed to the required circumferentially directed compressive stress.

Currently, although not limited thereto, the steps taken to direct stresses towards a circumferential direction are based on mechanical operations. One method is to radially expand a hollow shaft 12 by forcing an insert into the shaft=s center bore. Once the magnetoelastic element is deposited, the insert is removed and the shaft relaxes to its original dimensions leaving the magnetoelastic element correctly stressed.

An alternate approach manages the thermal expansion of the shaft 12 during the spray process. By restricting the shaft=s thermal growth in the axial direction, the radial expansion is amplified. When cooled, the stresses in the magnetoelastic element are compressive and favor a circumferential direction.

Other methods may be used to impart directional compressive stresses by mechanical means, such as axially yielding the shaft 12 beneath the thermal sprayed magnetoelastic element, and by peening the magnetoelastic element.

The present invention provides a low cost non-compliant torque sensor. Thermal spraying of the magnetoelastic element eliminates problems with other types of magnetoelastic torque sensors=active elements. With the invention, previous lack of integrity of the shaft 12 magnetoelastic element interface, stress corrosion cracking, inhomogeneity of magnetic properties and manufacturing processes that interfere with high volume production, no longer are hinder present to the introduction of magnetoelastic torque sensors into the automotive marketplace.

Automotive power steering systems require a measurement of the driver=s steering effort (i.e., steering wheel torque) in order to operate in a closed loop/on-demand mode. This torque measurement becomes the main control variable in a feedback loop intended to provide the driver with a comfortable power steering assist profile whose on-demand nature is transparent. Sophisticated power assist profiles can be non-linear, can utilize additional system inputs such as vehicle speed, steering wheel angular velocity, chassis suspension factors, road condition data, and can be optimized to suit the driver=s steering assist preference.

Power assist delivery schemes can utilize electrically directed hydraulics (e.g., cylinder bypass via solenoid valves), hydraulic flow control (e.g., a variable speed electrical power steering pump), or full electric assist (e.g., a torque motor on the steering column, pinion gear, or rack). Each method provides its own benefits to the system.

Measurements of the torque present at the tail shaft of an automatic transmission make possible more precise shifting. This would manifest as a smoother shift providing a higher level of driver comfort; as well as improved traction and fuel efficiency. Measuring torque at the transmission has the added benefit of providing another system variable input to the ECU, thereby, further optimizing control of engine emissions and fuel efficiency.

The magnetoelastic element 20 consists of a high nickel content powdered metal that is thermally sprayed onto an underlying non-magnetic shaft 12. Post processing permits the obtaining of circumferentially oriented magnetic domains in the coating. The thermal spray process utilized to deposit the magnetoelastic material, by nature, fuses the coating to the underlying shaft 12 creating a gradation at the substrate/coating interface boundary. This provides an intimate bond between the magnetoelastic element and the underlying shaft 12 that is capable of surviving the extreme torque levels that are well outside the full-scale measurement region of the torque sensor. Such "over-torque", conditions can exist in steering systems during curb push-away situations, and can be experienced in transmission applications during drastic torque reversals. Once the over-torque condition is relaxed, any resulting breakdown or slippage at the shaft/magnetoelastic element interface would cause a mechanical bias in the magnetoelastic element=s stresses. The consequence of this would be a corresponding magnetic bias in the magnetoelastic element=s transfer function. If the breakdown of the interface is localized, the result may be a magnetic incongruity that manifests as a variable in torque measurements with respect to the angular position of the shaft 12 (sometimes referred to as a rotational irregularity). The integrity of this interface is therefore crucial to the stability of the magnetic properties. Thermal sprayed coatings have typical bond strengths on the order of 10,000 psi or greater.

Additionally, the homogeneity of the thermally sprayed metal properties directly relates to consistency in the magnetic performance of the magnetoelastic element. For example, a high level of uniformity in the density of sprayed material, chemical composition, internal stresses, and the surface finish area achievable with thermal spray and translate into exceptional rotational regularity of the magnetic signal.

Furthermore, selection of the composition of the sprayed material in conjunction with spray parameters (particle size, particle velocity, powder feed rate, etc.) that foster maximum hardness, low levels of oxides and low porosity, yields a magnetoelastic element with optimum resistance to the effects of corrosives and stress cracking.

Utilizing the thermal spray process for the application of the magnetoelastic material onto a shaft is amenable to the high volume demands of the automotive marketplace.

We claim:

1. A method for providing, on a member having a longitudinal axis, a magnetoelastic transducer for producing an internally-contained magnetic field which has a circumferential orientation around the axis when the member is in a quiescent state, but which distorts from the circumferential orientation when a substantially torsional stress is applied to the member about said axis and produces a measurable external magnetic-field component representative of said stress, said method comprising the steps of:

applying to a surface region of the member which surrounds the axis a circumferential coating consisting essentially of a magnetostrictive material which is at a temperature exceeding the curie temperature of said material;

allowing the coating to cool to a temperature lower than said curie temperature; and at least while said coating temperature is lower than said curie temperature, applying a magnetic field to the coating to magnetically polarize said coating in a predefined circumferential direction around the axis.

2. A method for providing, on a member having a longitudinal axis, a magnetoelastic transducer for producing an internally-contained magnetic field which has a circumferential orientation around the axis when the member is in a quiescent state, but which distorts from the circumferential orientation when a substantially torsional stress is applied to the member about said axis and produces a measurable external magnetic-field component representative of said stress, said method comprising the steps of:

applying to a surface region of the member which surrounds the axis a circumferential coating consisting essentially of a magnetostrictive material which is at a predetermined temperature, wherein said applying is spraying of particles of the magnetostrictive material; and at least while said coating is being applied, applying a magnetic field to the member to magnetically polarize said coating in a predefined circumferential direction around the axis.

3. A method for providing, on a member having a longitudinal axis and a center bore, a magnetoelastic transducer for producing an internally-contained magnetic field which has a circumferential orientation around the axis when the member is in a quiescent state, but which distorts from the circumferential orientation when a substantially torsional stress is applied to the member about said axis and produces a measurable external magnetic-field component representative of said stress, said method comprising the steps of:

radially expanding the member by forcing an insert into said center bore of said member;

applying to a surface region of the member which surrounds the axis a circumferential coating consisting essentially of a magnetostrictive material while said member is radially expanded; and removing said insert from said center bore of said member, wherein said coating is magnetically polarized in a circumferential direction around the axis as said member relaxes to its original dimensions.

4. A method for providing, on a member having a longitudinal axis and a center bore, a magnetoelastic transducer for producing an internally-contained magnetic field which has a circumferential orientation around the axis when the member is in a quiescent state, but which distorts from the circumferential orientation when a substantially torsional stress is applied to the member about said axis and produces a measurable external magnetic-field component representative of said stress, said method comprising the steps of:

applying to a surface region of the member which surrounds the axis a circumferential coating consisting essentially of a magnetostrictive material while said member is radially expanded; and peening said coating on the member to magnetically polarize said coating in a predefined circumferential direction around the axis.

5. A method for providing, on a member having a longitudinal axis, a magnetoelastic transducer for producing an internally-contained magnetic field which has a circumferential orientation around the axis when the member is in a quiescent state, but which distorts from the circumferential orientation when a substantially torsional stress is applied to the member about said axis and produces a measurable external magnetic-field component representative of said stress, said method comprising the steps of:

constructing a first film element on said member, said first film element having a magnetic field polarized in a first circumferential direction;

constructing a second film element on said member spaced apart from said first film element, said second film element having a magnetic field polarized in a second circumferential direction opposite said first circumferential direction; and interposing a flux collection guide between said first and second film elements.

* * * * *